Sept. 25, 1962 A. H. BATTISON ETAL 3,055,582

PERFORATED RECORD READER

Filed Aug. 25, 1960 2 Sheets-Sheet 1

INVENTORS
ALVIN H. BATTISON
IRA M. HIX
CHARLES B. SMITH
VICTOR O. WILKERSON

BY Ronald J. Kransdorf
AGENT

Sept. 25, 1962 | A. H. BATTISON ETAL | 3,055,582

PERFORATED RECORD READER

Filed Aug. 25, 1960 | 2 Sheets-Sheet 2

United States Patent Office 3,055,582

Patented Sept. 25, 1962

3,055,582
PERFORATED RECORD READER

Alvin H. Battison, Ira M. Hix, Charles B. Smith, and Victor O. Wilkerson, Vestal, N.Y., assignors to International Business Machines Corporation, New York, N.Y., a corporation of New York Filed Aug. 25, 1960, Ser. No. 51,809
3 Claims. (Cl. 235—61.11)

This invention relates to record reading devices and more particularly to a photoelectric device for reading code indicia of a perforated record.

Information utilized in modern electronic data processing machines may be received from several input sources among which are devices for reading perforated record media such as punched tape. Heretofore, such devices have had relatively low operating speeds compared with the utilization rate of electronic data processing machines such as digital computers, and have posed a problem when considering data transmission to and from the computer. Prior art schemes attempting to solve this problem generally provide a buffer storage unit into which data are read from the tape and from which data may be summoned on demand of the computer. In this way, the low operating speed of a tape reading device may be compensated for; however, the result is an indirect means of transmitting data from perforated record tape to a high speed data processing unit with attendant cost of the buffer storage unit.

Underlying the general problem of low operating speeds associated with perforated tape reading devices is the limitation on tape transport speed imposed by the tape itself. The spatial relation of a multiplicity of perforations denominating coded data necessarily affects tape strength, which in turn limits the maximum acceleration forces capable of being sustained by the tape. Hence, travel speed of moving tape being read by stationary means exemplified in certain prior art devices and consequently, data reading rate, is dependent on the minimum strength a tape punched with a particular code and density will have. The reading rate of such devices may be increased by increasing tape travel speed or the density of the perforations, or a combination of both. In any case a definite limit will be imposed by the limited strength of the tape.

Therefore, it is a principal object of this invention to provide a high speed perforated tape reading device that avoids the limitation imposed on the tape feed rate by the strength of the tape.

Another object is to provide a data processing input device for directly transmitting information to a high demand utilization device.

In accordance with the present invention, the above objects are achieved by positioning a perforated flexible record such as a punched tape, on a normally stationary, cylindrical member having a plurality of light guides radially arranged inside of it and a photoelectric device rotating at high speed at its center. Light radiated on the surface of the tape on the drum by a suitably positioned light source passes through perforations in the tape and through light guides overlaid by the perforations to the center of the cylindrical member. The light so transmitted is scanned by the rotating photoelectric device, the photoelectric device generating a series of coded output signals corresponding to the data read from the tape.

The present invention has several advantages over prior art devices. One advantage is that information will be directly transmitted to the utilization device thereby eliminating the need for buffer storage. Another advantage is that the rate of reading perforated tape is greatly increased without a corresponding increase in the moment of inertia of the rotating system, the increased reading rate achieved by this device being comparable to the data demand and utilization frequencies of electronic digital computers. Since the tape is being read at the same speed as other computer memory devices, it is possible to address individual tape positions allowing for a degree of random access to the tape.

Other objects will be pointed out in the following description and claims and illustrated in the accompanying drawings, which disclose, by way of example, the principle of the invention and the best mode which has been contemplated of applying that principle.

The following description will be concerned solely with a device for reading a perforated tape record, but it is to be here understood that this device is adaptable to read any flexible perforated record media.

Figure 1:
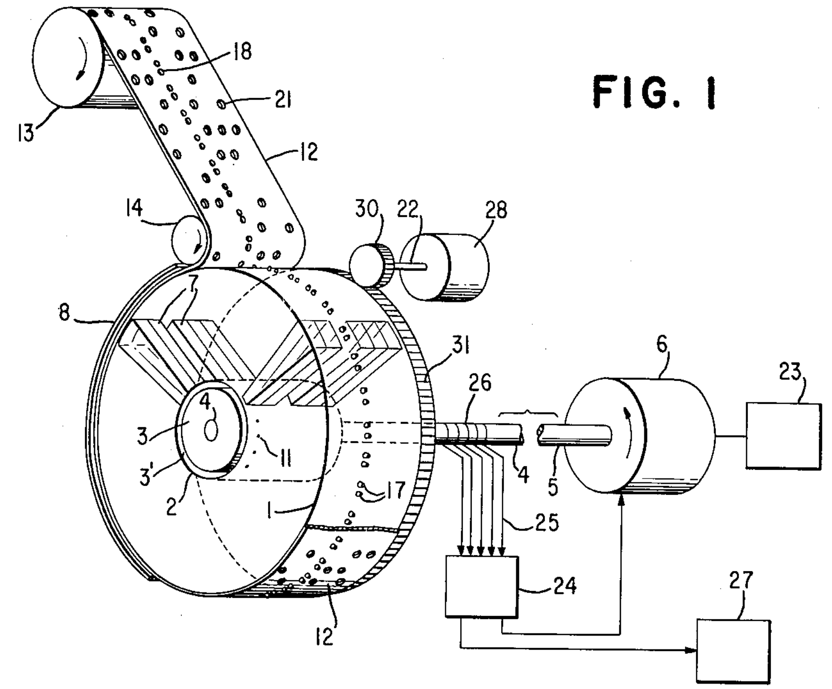
FIG. 1 is a diagrammatic perspective view of one embodiment of the invention including parts of its utilization system.
Figure 4:
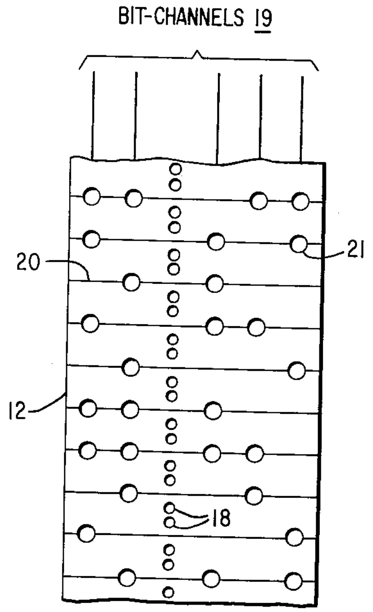
FIG. 4 is a fragment of conventional perforated record tape.

Referring to FIG. 1, a conventional record tape 12, perforated according to a five bit code, is shown wrapped about a normally stationary drum 1 to be read by a rotatable scan cylinder 3. Tape 12 (FIG. 4) has five bit-channels 19 provided to accommodate the five-bit code, which bits are arranged in coded combination to form a character of information along character lines 20 transverse to bit-channels 19. By this arrangement of bits of information, reading of the record tape will be parallel by bit and serial by character.

Figure 3:
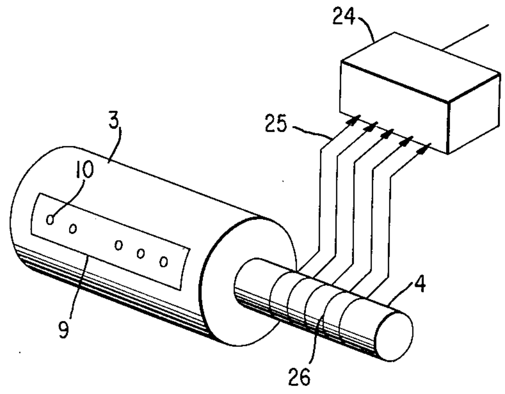
FIG. 3 is a diagrammatic perspective view of the rotating scan drum carrying the photosensitive elements.

In FIG. 1, the normally stationary cylindrical member or drum 1 is shown as having a central bore 2 in which a rotatable element or cylinder 3 mounted on shaft 4 is inserted for rotation. An air gap 3′ is left between the cylinder and the bore to allow for thermal expansion, etc., of the materials used. Shaft 4 may be integral with, or may be mechanically coupled to, a continuously rotating shaft 5 powered from a source 23 and having mounted thereon a magnetic drum 6. A plurality of light guide means, light tubes 7, in drum 1 conduct light being emitted from a light source 8, to a row 9 of photosensitive electrical elements 10 which may be photodiodes recessed in the periphery of cylinder 3 (FIG. 3). Light source 8, which may be of any suitable type, circumscribes drum 1 radiating at least as much of the tape 12 on the periphery of the drum as is to be read on a single cycle of operation. Row 9 of photoelectric elements 10 is aligned parallel to the rotational axis of cylinder 3 as shown. Tubes 7 extend radially from bore 2 to the periphery of drum 1 in spoke like fashion and are arranged in five parallel planes, one for each bit channel 19 on tape 12. The light tubes are tapered so that at the periphery of drum 1 they appear at equal circumferential intervals corresponding with the linear distance between character lines 20 on tape 12, and at bore 2 of drum 1 they appear at equal more closely spaced intervals generally corresponding to the bit space interval on the surface of the magnetic drum 6. In effect, the normal bit-density (i.e., number of bits per lineal inch) at the periphery of drum 1 will be increased at bore 2. This increased bit density coupled with the r.p.m. of shaft 4 carrying cylinder 3 permits a greatly increased tape reading rate with lower mechanical inertia than would otherwise be obtained by scanning the normal bit density with a larger scanning drum.

The length of the tubes 7 is uniform and should be sufficient to provide an optimum light to dark ratio for efficient light transmission from source 8 to photoelectric elements 10 on cylinder 3. The light to dark ratio may also be improved by blackening the sides of the light tubes. The number of photoelectric elements 10 and light tube planes will, of course, vary with the number of bit channels 19 required by the particular tape code used.

Figure 2:
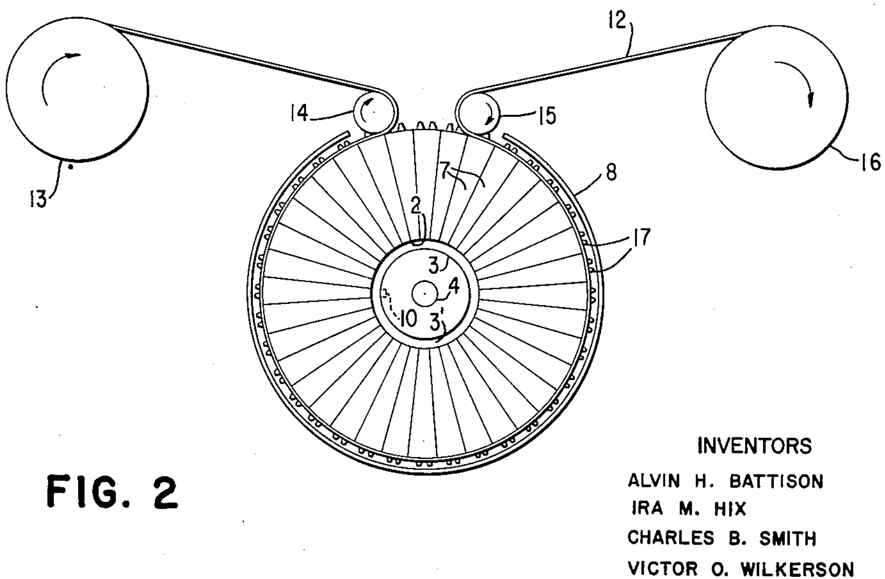
FIG. 2 is a side view of the embodiment of the invention shown in FIG. 1.
Figure 5:
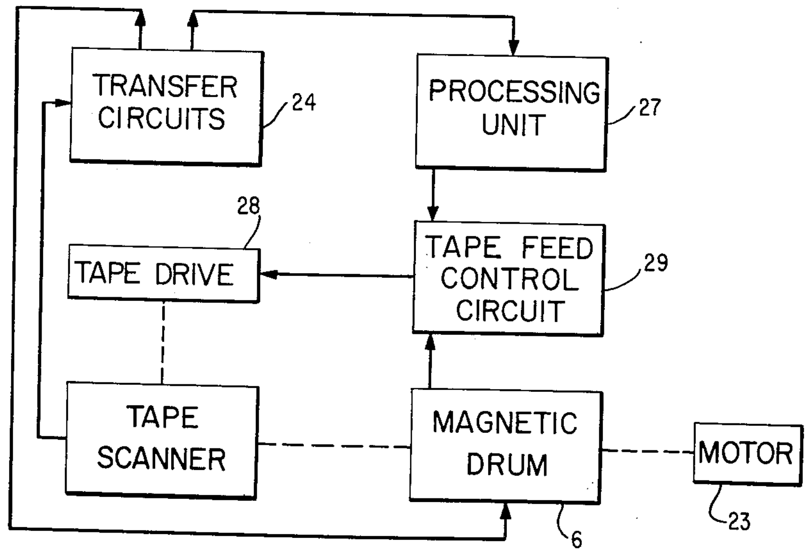
FIG. 5 is a block diagram of a utilization system embodying the invention.

Tape 12 will be taken from a supply reel 13 (FIG. 2), threaded about idler 14, positioned on drum 1 by means of a line of perforations 18 on tape 12 and sprocket pins 17 on drum 1, and then passed over idler 15 to a take up reel 16. Reels 13 and 16 may be spring slip driven as on a movie projector. Sprocket pins 17 serve to align perforations 21 in tape 12 with light tubes 7 on the periphery of drum 1 and to compensate for any variation in tape length that may develop. The relative positions of idlers 14 and 15, with respect to drum 1, effectively define the length of record tape to be read. Tape 12 is advanced into reading position on the drum 1 and is delayed in that position for a scanning operation under the control of demand signals generated by the utilization circuit in a processing unit 27 (FIG. 5). These signals are fed through the tape feed control circuit 29 to the tape drive means 28. Shaft 22 of the motor 28 (FIG. 1) has mounted thereon a pinion 30 which meshes with annular gear 31 on drum 1 to rotate the drum or lock it in its existing position. The tape drive means 28 has indexing properties and may be, for example, a Geneva drive or a relay controlled single tooth feed control clutch having a time delay element. The indexing properties of the tape drive means allow tape 12 to be metered to provide wholly new tape sections, partly new tape sections or the same tape section for successive read operations.

Pulses generated by the photosensitive elements 10 during a reading of tape 12 are picked up by brushes on lines 25 from related slip rings 26 associated with respective photoelectric elements 10 on shaft 4. These pulses are gated through transfer circuits 24 to magnetic drum 6 or to another processing unit 27 of the utilization device.

To summarize the operation of the device, drum 1 is rotated in response to a demand signal generated by the processing unit 27 and applied to the tape drive means 28 by tape feed control circuit 29 (FIG. 5). As drum 1 is rotated, a discret segment of tape 12 is positioned about drum 1 and remains in a fixed position on the drum for as long a time as is required for the data to be read. Each perforation on tape 12 will overlay a single light tube 7 on the periphery of drum 1 and will permit light from source 8 to pass through the tape and to be transmitted through the corresponding light tube 7 to form a discrete light spot 11 at the bore 2 of drum 1. The light spots so formed are scanned by the row 9 of photo electric elements 10 on the rotating cylinder 3, the coded electrical signals emitted by the elements 10 being picked up by the rings 26 and transmitted through lines 25, and transfer circuit 24 to the magnetic drum 6 or the processing unit 27.

It can be seen that, since the scanning cylinder 3 and the magnetic memory drum 6 are of the same diameter and are driven at the same speed, being mounted on a common shaft, information may be read directly from the tape 12 into the drum 6 without the need for a buffer storage device. Further since there is, with this device, a one-to-one correspondence between character lines 20 and memory drum address positions, it is possible to address the tape by word and to read particular bits of information from the tape under control of the utilization device. With this device it is therefore possible to attain a degree of random access in reading perforated tape.

The drum 1, as described so far, is constructed of two concentric transparent rings, the outer ring forming the periphery and the inner ring the bore of the drum, the space between these rings being filled by wedge-shaped light guides 7 of Lucite or some other suitable material. It is also within the concept of this invention to use as the drum 1 a solid cylinder of blackened material having a central bore 2 and having as light guides 7 cylindrical spoke-like holes radiating from the bore 2 to the points on the surface of the drum which are to be overlaid by perforations 21 in tape 12.

The drum 1, as described so far, is constructed of two concentric transparent rings, the outer ring forming the periphery and the inner ring the bore of the drum, the space between these rings being filled by wedge shaped light guides 7 of Lucite or some other suitable material. It is also within the concept of this invention to use as the drum 1 a solid cylinder of blackened material having a central bore 2 and having as light guides 7 cylindrical spoke like holes radiating from the bore 2 to the points on the surface of the drum which are to be overlaid by perforations 21 in tape 12.

While the invention has been particularly shown and described with reference to a preferred embodiment thereof, it will be understood by those skilled in the art that various changes in form and details may be made therein without departing from the spirit and scope of the invention.

We claim:

1. A device for reading a flexible record having uniformly distributed code bit positions selectively perforated to represent data, comprising in combination a cylindrical member having a coaxial bore, positioning means for wrapping said record about the periphery of said cylindrical member, a light source adapted to radiate the record on the periphery of said cylindrical member, photoelectric means freely rotatable inside of said bore about the axis of said cylindrical member, a plurality of light guide means radially positioned in said cylindrical member and each extending outwardly from said bore to an individual spot at the periphery of said cylindrical member overlaid by a related code bit position of said record, the spacing between radially adjacent light guide means being greater at the periphery of said cylinder than at its bore, and means to rotate said photoelectric means to present the same at successive times to the inner ends of said light guide means.

2. A photoelectric device for reading a record tape having uniformly distributed code bit positions selectively perforated to represent data, comprising in combination a normally stationary cylindrical member having a coaxial bore, means including said cylindrical member for properly positioning successive sections of said tape about the periphery of said cylindrical member, a light source adapted to radiate the tape on the periphery of said cylindrical member, rotatable means located within the bore of said cylindrical member, photoelectric means mounted on said rotatable means, a plurality of light guide means radially positioned in said cylindrical member and each extending outwardly from said bore to an individual spot at the periphery of said cylindrical member overlaid by a related code bit position of said tape record, the spacing between radially adjacent light guide means being greater at the periphery of said cylinder than at its bore, and means to rotate said rotatable means to present said photoelectric means at successive times to the inner ends of said light guide means.

3. A device for transmitting coded bits of information directly from a perforated record tape to a high speed utilization device, comprising in combination a normally stationary cylindrical member having a coaxial bore; means including said cylindrical member for properly positioning successive sections of said tape about the periphery of said cylindrical member, said means being controlled by said utilization device; a light source adapted to radiate the tape on the periphery of said cylindrical member; a plurality of light guide means radially positioned in said cylindrical member and each extending outwardly from said bore to an individual spot at the periphery of said cylindrical member overlaid by a related code bit position of said tape record, the spacing between radially adjacent light guide means being greater at the periphery of the cylinder than at its bore; photoelectric means freely rotatable inside of said bore about the axis of said cylindrical member, means for rotating said photoelectric means to present the same at successive times to the inner ends of said light guide means, the frequency at which said photoelectric means is presented to said light guide means being equal to the data demand frequency of said utilization device; and means for transmitting coded pulses generated by said photoelectric means directly to said utilization device.

References Cited in the file of this patent

UNITED STATES PATENTS

| | | |
|---|---|---|
| 1,866,606 | Warner | July 12, 1932 |
| 2,234,697 | Hickman | Mar. 11, 1941 |
| 2,575,034 | Tyler et al. | Nov. 13, 1951 |
| 2,677,815 | Brustman | May 4, 1954 |
| 2,938,666 | Rand | May 31, 1960 |